R. C. HENDERSON.
INTERMITTENT OPERATING MECHANISM.
APPLICATION FILED APR. 9, 1914.
1,240,140.
Patented Sept. 11, 1917.
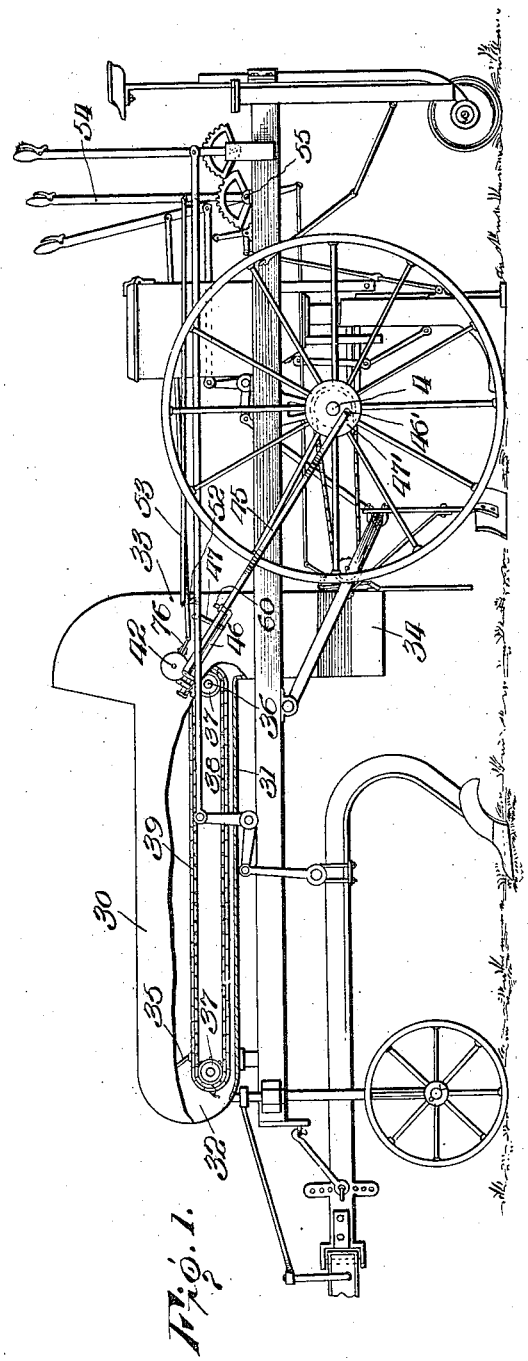
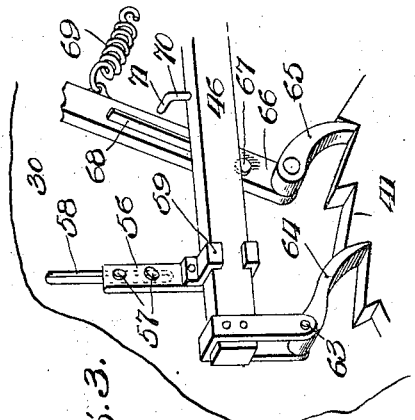
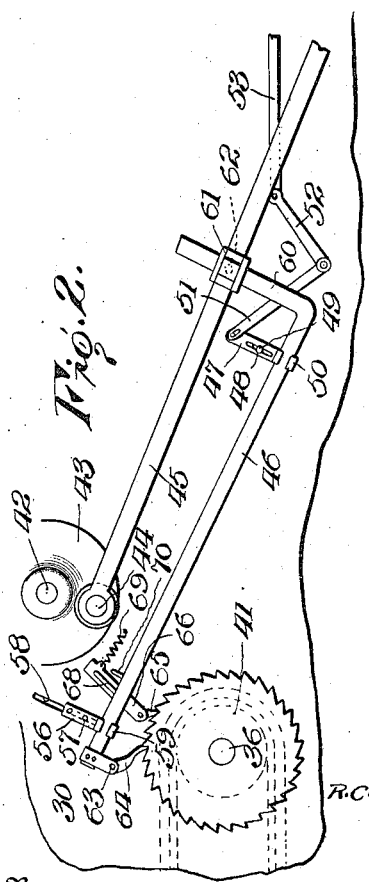
Inventor
R. C. Henderson
Attorneys

UNITED STATES PATENT OFFICE.

RUFUS C. HENDERSON, OF KANKAKEE, ILLINOIS.

INTERMITTENT OPERATING MECHANISM.

1,240,140.                Specification of Letters Patent.    Patented Sept. 11, 1917.

Application filed April 9, 1914.  Serial No. 830,775.

*To all whom it may concern:*

Be it known that I, RUFUS C. HENDERSON, citizen of the United States, residing at Kankakee, in the county of Kankakee and State of Illinois, have invented certain new and useful Improvements in Intermittent Operating Mechanism, of which the following is a specification.

This invention relates to intermittent operating mechanisms and has as its object to provide a mechanism of this class which will prove highly efficient when employed in connection with the conveyer aprons of fertilizer distributers.

It is one aim of the invention to provide a mechanism of this class which when employed in connection with such an apron as mentioned above, may be controlled in its operation so as to vary the speed of travel of the apron at the will of the operator so that the quantity of fertilizer deposited may be at all times controlled.

In the accompanying drawings:

Figure 1 is a side elevation of the mechanism embodying the present invention employed in connection with an agricultural machine.

Fig. 2 is a side elevation in detail of the mechanism.

Fig. 3 is a perspective view of a portion of the mechanism.

Corresponding and like parts are referred to in the following description and indicated in all the views of the accompanying drawings by the same reference characters.

As before stated the intermittent operating mechanism embodying the present invention is designed chiefly for employment in intermittently advancing the apron of a fertilizer distributing mechanism and is so illustrated in the drawing. The fertilizer distributing mechanism includes a box having sides 30, a bottom 31, and an open forward end 32. The box is mounted upon the forward portion of the frame of the machine and at its rear end opens into a hopper 33 having spaced discharge spouts 34 through which the fertilizer is to be discharged. A shaft 35 is mounted for rotation in the forward end of the box, and a shaft 36 is mounted for rotation in the rear end of the box. These shafts carry sprocket gears 37 over which are trained sprocket chains 38 supporting an apron 39 upon which the fertilizer is deposited for distribution.

The mechanism embodying the present invention is designed to move the apron 39 with a continuous and even motion and at any speed desired by the operator of the machine, the mechanism being adjustable to vary the speed of travel of the apron while the distributer is in operation and without the necessity of stopping the machine for the purpose of securing such adjustment, and this mechanism will now be described. One end of the shaft 36 extends through one side of the fertilizer box and has fixed upon it a ratchet gear 41. For a purpose to be presently explained, a shaft 42 is rotatably mounted at the said side of the box and has fixed upon it at its outer end a crank disk 43 carrying a crank pin 44 to which is connected one end of a pitman 45. This pitman 45 is connected at its other end to a crank pin 46' upon a crank disk 47' fixed upon one end of the axle 4. It will now be apparent that as the machine is drawn forwardly, the shaft 42 will be rotated through the medium of the crank disks and pitman 45, and the invention contemplates that reciprocatory motion of the pitman shall be transmitted to a pawl mechanism coacting with the ratchet gear 41, whereby to rotate the said gear and impart rotary movement to the shaft 36. The pawl mechanism includes a bar 46 which is mounted for reciprocatory movement in guides arranged upon the side of the fertilizer box. One of these guides comprises a plate 47 formed with a slot 48 through which is fitted a bolt 49, the bolt being secured through the said side of the box. The bolt 49 loosely fits within the slot 48 so that the plate may have up and down sliding movement, such movement being necessary for the purpose of adjusting the bar 46. The plate 47 at its lower end is provided with an open collar 50 in which the said bar 46 is slidably fitted and the plate is pivoted at its upper end, as at 51, to one arm of an angle lever 52, the other arm of the angle lever having connected to it a rod 53 which extends to a lever 54 mounted upon a cross piece 55 which extends between the sides of the frame of the machine. The other guide bracket in which the bar 46 is mounted comprises a plate 56 carrying spaced bolts 57 which are slidably fitted in a slot 58 formed in the side of the fertilizer box. The plate 56 is provided at its lower end with an open collar 59 slidably receiving the forward end of the bar 46. It will now be apparent that when the lever 54 is rocked upon its pivot, the angle lever 52 will be rocked in one direction or the other, thereby lifting or lowering the bar 46. It will be evident, however, that such adjustment will not in any way interfere with the reciprocatory movement of the bar. Such movement is imparted to the bar in a manner which will now be explained. The rear end of the bar is provided with an upstanding arm 60 which is mounted for up and down sliding movement in a cuff 61 which is swiveled as at 62 to the pitman 45. It will be apparent that as the pitman reciprocates, the bar 46 will be caused to correspondingly move, the cuff 61 riding up and down upon the arm 60 to compensate for the slight oscillatory motion of the said pitman. Pivoted as at 63 to the forward end of the bar 46 is a pawl 64 which coöperates with the teeth of the ratchet gear 41, it being obvious that as the bar 46 moves rearwardly, rotative movement will be imparted to the said gear and that as the bar moves forwardly the pawl 64 will ride over the teeth of the said gear. In order that continuous rotary movement, as distinguished from intermittent rotary movement, may be imparted to the gear 41 there is provided a second pawl, indicated by the numeral 65, and pivotally mounted at the lower end of a plate 66. This plate 66 is pivoted for rocking movement, as at 67, upon the side of the fertilizer box and is provided with a longitudinally extending rib 68. A spring 69 is connected to the plate at or adjacent its upper end and to the side of the fertilizer box and yieldably holds the plate with its upper end swung rearwardly, as clearly shown in Fig. 2 of the drawing. The bar 46 is provided with an upstanding finger 70 having a laterally projecting end 71 which, upon forward movement of the bar, is designed to engage with the rib 68, thereby swinging the upper end of the plate 66 forwardly against the tension of the spring 69 and swinging its lower end which carries the pawl 65 rearwardly. It will now be apparent that upon the rearward movement of the bar 46, the pawl 64 coöperates with the ratchet gear 41 to impart rotary movement thereto, and that such movement is imparted to the gear, upon the forward movement of the bar 46, by reason of the coöperation of the pawl 65 with the gear. It will furthermore be apparent that when the bar 46 and the pawl 64 and 65 are in the position shown in Fig. 2 of the drawings and the mechanism is in operation, the ratchet gear 41 will be rotated at a certain definite speed. Should it be desired to decrease the speed of rotation of the gear, the lever 54 is swung rearwardly, thereby elevating the bar 46 to a greater or less degree and, consequently, moving the pivot 63 of the pawl 64 in a direction away from the periphery of the gear 41. In a like manner, the finger 71 will be elevated so that it will engage the rib 68 at a higher point than when in the position shown in Fig. 2. In both instances, the pawls 64 and 65 will be moved a shorter distance as the bar 46 is reciprocated and, consequently, the speed of rotation of the gear 41 will be decreased and the apron 39 will be advanced more slowly than when the mechanism is adjusted as in Fig. 2. Of course, if it is desired to increase the speed of the gear 41, the lever 54 is to be rocked so as to lower the bar 46 to a greater or less degree.

Having thus described the invention, what is claimed as new is:

1. In a mechanical movement, a driven shaft, a drive shaft, operative connection between the said shafts, a ratchet carried by the driven shaft, a member mounted for reciprocatory movement, a pawl carried by the member and coöperating with the said ratchet, a second pawl coöperating with the ratchet, means tending to move the second-mentioned pawl in a direction opposite that to rotate the ratchet, means carried by the member arranged to move the second-mentioned pawl in an opposite direction upon movement of the said member in one direction, means for moving the said member, and means for adjusting the member with relation to the ratchet, whereby to vary the amplitude of movement of the pawls with respect to the ratchet.

2. In a mechanical movement, a driven shaft, a drive shaft, operative connection between the said shafts, a ratchet carried by the driven shaft, a member mounted for reciprocatory movement, a pawl carried by the said member and coöperating with the said ratchet, a pawl pivotally mounted adjacent the said member and coöperating with the ratchet, means for reciprocating the member, means for adjusting the member toward and away from the ratchet, and means upon the member arranged to coöperate with the second mentioned pawl in all positions of adjustment of the said member to actuate the pawl upon reciprocation of the member.

3. In a mechanical movement, a driven shaft, a drive shaft, operative connection between the said shafts, a ratchet carried by the driven shaft, a member mounted for reciprocatory movement, a pawl carried by the member and coöperating with the ratchet, a plate mounted for pivotal movement, a pawl carried by the plate and coöperating with the ratchet, a rib upon the plate, a stud upon the said member arranged to engage with the rib when the member is reciprocated in one direction, means for reciprocating the member, and means for adjusting the member toward and away from the ratchet.

4. In a mechanical movement, a driven shaft, a drive shaft, operative connection between the said shafts, a ratchet carried by the driven shaft, a member mounted for reciprocatory movement, a pawl carried by the said member and coöperating with the ratchet, a member mounted for pivotal movement, a pawl carried by the member and coöperating with the ratchet, means tending to move the said pivoted member upon its pivot in one direction, means carried by the first-mentioned member and coöperating with the second-mentioned member when the first-mentioned member is reciprocated in one direction, whereby to rock the second-mentioned member against the action of its said moving means, means for reciprocating the first-mentioned member, and means for adjusting the same toward and from the said ratchet.

5. In a mechanical movement, a driven shaft, a drive shaft, operative connection between the said shafts, a ratchet carried by the driven shaft, a guide adjustably mounted, a bar mounted for reciprocatory movement in the said guide, a pawl carried by the bar and coöperating with the ratchet, a member mounted for pivotal movement, a pawl carried by the member and coöperating with the ratchet, means for reciprocating the bar, means for adjusting the said guide, whereby to adjust the bar with relation to the ratchet, and means carried by the bar and arranged to coöperate with the said movable member in all positions of adjustment of the bar.

6. In a mechanical movement, a driven shaft, a drive shaft, operative connection between the said shafts, a ratchet carried by the driven shaft, a guide mounted for adjustment, a bar mounted for reciprocatory movement in the guide, a pawl carried by the bar and arranged to coöperate with the ratchet to turn the same when the bar is moved in one direction, a pawl arranged for actuation by movement of the bar in the other direction to coöperate idly with the ratchet, means for moving the second-mentioned pawl in a direction to run idly on the ratchet, and means for adjusting the bar with relation to the ratchet, whereby to vary the amplitude of movement of the pawls in a direction to turn the ratchet.

7. In a mechanical movement, a driven shaft, a drive shaft, operative connection between the said shafts, a ratchet carried by the driven shaft, a guide mounted for adjustment, a bar mounted for reciprocatory movement in said guide, a pawl carried by the bar and coöperating with the ratchet, a plate mounted for pivotal movement, a pawl carried by the plate at one side of the pivot thereof and coöperating with said ratchet, a rib upon the plate at the other side of the pivot thereof, a pin carried by the bar and arranged to engage with the rib upon movement of the bar in one direction, whereby to rock the plate upon its pivot, a spring connected with the plate at the last-mentioned side of the pivot for returning the plate to normal position, the bar being provided with an arm, a pitman mounted for movement across the arm, and connection between the arm and pitman.

In testimony whereof I affix my signature in presence of two witnesses.

RUFUS C. HENDERSON. [L. S.]

Witnesses:
B. E. GAST,
L. L. SMITH.

Copies of this patent may be obtained for five cents each, by addressing the "Commissioner of Patents, Washington, D. C."